(12) United States Patent
Daniel et al.

(10) Patent No.: US 7,136,216 B1
(45) Date of Patent: Nov. 14, 2006

(54) DUAL-STAGE TAPE-SEALING OF MICROCELLS OR CHANNELS FOR DISPLAY APPLICATIONS

(75) Inventors: Jurgen H. Daniel, San Francisco, CA (US); Michael L. Chabinyc, Burlingame, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 11/300,964

(22) Filed: Dec. 15, 2005

(51) Int. Cl.
   *G02B 26/00* (2006.01)

(52) U.S. Cl. .................. 359/296; 359/297; 359/290

(58) Field of Classification Search ............... 359/296, 359/290, 297, 238, 240, 241, 242
   See application file for complete search history.

*Primary Examiner*—Timothy Thompson
(74) *Attorney, Agent, or Firm*—Kent Chen

(57) ABSTRACT

A novel method of sealing ink in a microcell is described. A microcell is formed and an ink deposited in the microcell. A pressure sensitive tape seals the microcell. Ultraviolet light changes the properties of the adhesive in the pressure sensitive tape such that the material deposited in the microcell does not adhere to the adhesive. The described method is particularly useful for forming display structures.

23 Claims, 3 Drawing Sheets

*FIG. 1*
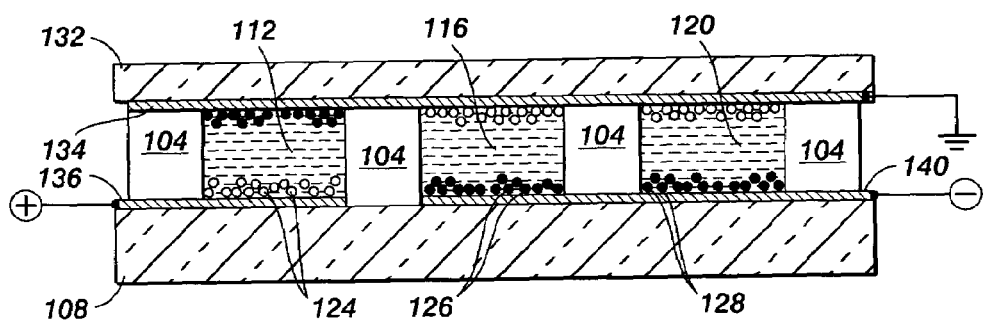
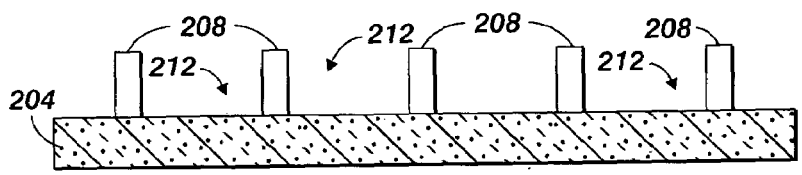
*FIG. 2*
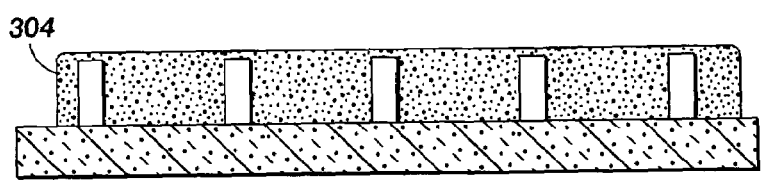
*FIG. 3*

FIG. 4
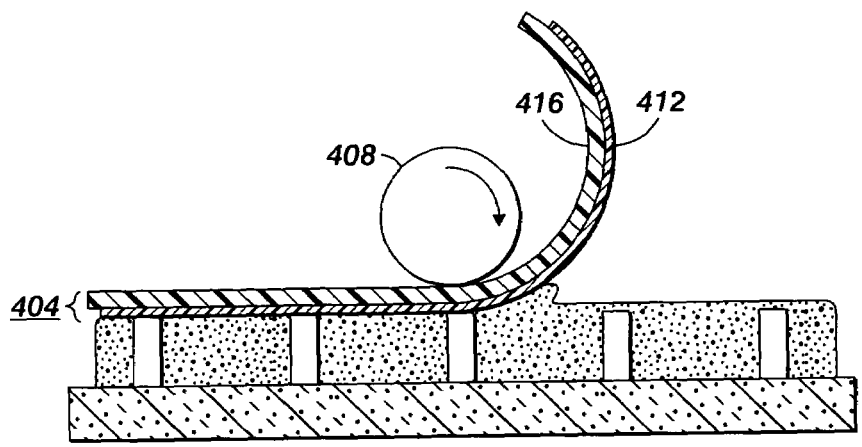
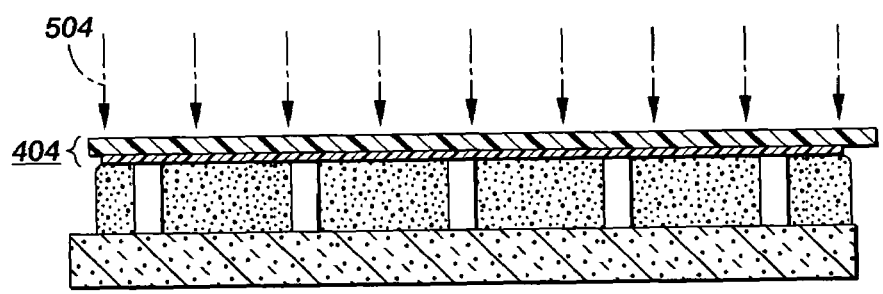
FIG. 5
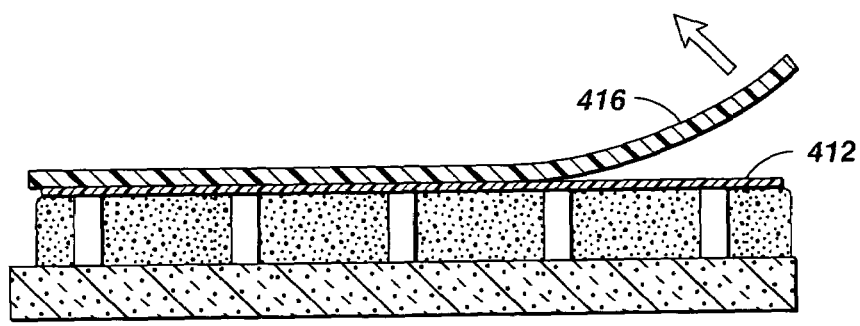
FIG. 6

DUAL-STAGE TAPE-SEALING OF MICROCELLS OR CHANNELS FOR DISPLAY APPLICATIONS

BACKGROUND

Many displays, including electrophoretic displays, magnetophoretic displays, toner displays and potentially other electrowetting-based displays utilize microcells filled with a display medium. The display medium may include ink, toner or other materials that change light reflectance or transmittance properties based on applied electric or magnetic fields. In some displays each microcell represents an image pixel. In high resolution systems, each pixel, and thus each microcell is extremely small. Sealing these extremely small microcells has been a challenge.

In the past, various sealing methods have been used. In one method, a liquid polymer overcoating is spread onto a liquid display material filled cells. The overcoating hardens to form a cell cap sealing in the display medium. In an alternate embodiment, a liquid display medium is mixed with a sealing media as described in U.S. patent application Ser. No. 10/237,522 entitled 'Electrophoretic Display and Novel Process for its Manufacture' which is hereby incorporated by reference. The mixture is deposited in a cell. Over time, the two media undergo a phase separation with the less dense sealing media resting over the display media. After phase separation and curing, the sealing material seals the display material in a cell.

One problem with the described sealing methods is that liquid based sealing methods are sensitive to the display material and sealing fluid surface tensions as well as the surface energy of adjacent cell walls. A second problem is that the described sealing method is unsuitable for powders, empty cells, and other non-liquid based display materials. A third problem is that sealing polymers may be hygroscopic, the presence of moisture causing display degradation.

An alternative sealing method is to laminate a cover sheet over the cells. However, lamination usually involves a liquid or viscous adhesive. Without careful controls, the liquid adhesive may displace ink in the cells or interact with the display fluid.

Conventional pressure sensitive films based on tackifiers have also been used to seal the display. The term "pressure sensitive" indicates that the adhesive bond is formed on contact, without wetting, heating, or adding a curing agent. The term 'tack' defines the degree to which a pressure sensitive adhesive feels sticky or highly adhesive. However, the sticky adhesive may interact with display fluids. In particular, the small size of the cells makes it difficult to confine the sticky adhesive only to regions of contact with the cell walls; thus the sticky adhesive also covers the cell opening and contacts the display fluid creating problems. For example, in an electrophoretic display, ink particles in the display may adhere to the tacky adhesive compromising display quality. The display fluid may also diffuse into the adhesive polymer or swell the adhesive polymer. These effects can substantially degrade display material functionality and thereby reduce display contrast.

Additional problems include 'creep' which is a slow movement of the adhesive or backing under stress. Creep is highly undesirable in applications such as flexible displays.

Thus an improved method of sealing a display cavity is needed

SUMMARY

A method for sealing a microcell is described. In the method, a microcell cavity is formed, the cavity includes walls surrounding an opening. A display material is placed inside the microcell cavity and the opening sealed with a pressure sensitive adhesive tape. The adhesive tape is then exposed to ultraviolet light. The ultraviolet light crosslinks polymers in the adhesive such that a first region of the adhesive in contact with the wall bonds to the wall. Regions of the adhesive tape over the opening lose their adhesive properties such that the ink inside the microcell cavity may contact the adhesive without adhering to the adhesive.

BRIEF DESCRIPTION OF THE DRAWINGS

FIG. 1 shows a cross sectional view of a two-particle electrophoretic display that may be fabricated using the described procedures.

FIG. 2 shows the formation of cell walls over a substrate.

FIG. 3 shows the deposition of display ink in microcells formed by the cell walls.

FIG. 4 shows a pressure sensitive tape applied over the cell walls.

FIG. 5 shows exposing the pressure sensitive tape to UV radiation.

FIG. 6 shows removal of a release liner leaving only a thin crosslinked adhesive layer sealing the ink in the microcells.

DETAILED DESCRIPTION

Figure 7:
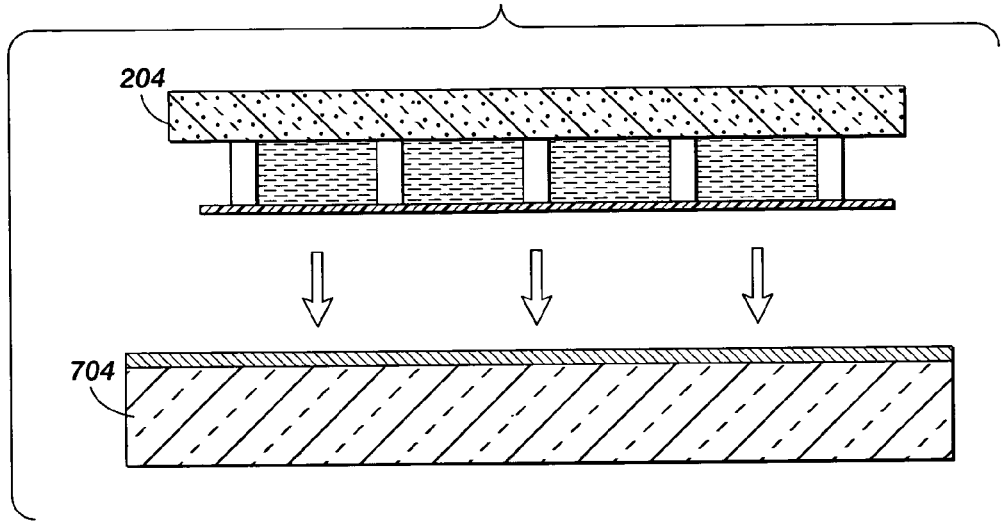
FIGS. 7 and 8 shows using the procedures described in FIGS. 2 to 6 to form a display.

An improved method of encapsulating display material is described.

FIG. 1 shows a cross sectional view of an example two-particle electrophoretic display. In FIG. 1, a plurality of cell walls 104 formed on substrate 108 produces a plurality of microcells 112, 116, 120. As used herein, "microcell" is broadly defined to include any cavity, cell, channel, or other volume of space substantially surrounded by a container like structure. A display material, such as an ink, fills each microcell. The illustrated embodiment shows a two particle ink. The illustrated two particle ink includes light colored particles 124 and dark colored particles 128 although additional particles may be used. A transparent cover 132 seals the microcell cavities.

During operation, electric potentials are applied to electrodes 136, 140 positioned adjacent the microcell cavities. The charge placed on electrodes 136, 140 controls movement of the ink particles in each microcell. In the illustrated example, a positive charge placed on a first electrode 136 attracts oppositely charged ink particles (in the illustrated embodiment, light colored particles) and repels other positively charged ink particles (dark colored particles). Meanwhile, a negative charge placed on second electrode 140 attracts positively charged dark particles and repels negatively charged light particles. By controlling the electrode charge, and thus the particle positions in each microcell, a drive circuit can control the color seen by a viewer.

In some displays each microcell may represent an image pixel. In others the cells may be smaller than the pixel area or they may be larger. Together, the aggregation of pixels determines the image displayed. Display driver circuitry (not shown) receives an image to be displayed and adjusts the electrode voltages to each microcell such that the microcells controlled by pixel-electrodes, form the desired image.

A general description of electrophoretic displays is provided in U.S. Pat. No. 3,892,568 (1975) entitled 'Electrophoretic image reproduction process' and hereby incorporated by reference.

One challenge in forming the illustrated display structure of FIG. 1 is properly sealing the ink samples in very small microcells that typically have widths ranging from 10 to 400 microns and depths ranging from 5 to about 200 microns. FIGS. 2–7 show one method of fabricating and sealing microcells for use in a display, although it should be understood that the fabricating and sealing techniques described may also be used for fabricating and sealing cells in other devices, such as sensors.

In FIG. 2, a substrate 204 is deposited and cell walls 208 formed over the substrate. Together, the cell walls and substrate form microcells 212. The cell walls may be made by various techniques, including but not limited to photolithography, molding, stamping, etching and laser ablation. In one embodiment, the cell walls are SU-8 (Microchem Corp.) cells patterned onto a substrate 204. Substrate 204 may be the backplane to a display such as a passive or an active matrix backplane. Substrate 204 may also be a top plate formed with a transparent conductive material such as indium tin oxide (ITO). A surface coating or surface treatment may be applied to the surface of the cell walls and the substrate. Examples of surface treatments include, but are not limited to, a silane surface coating, a fluorocarbon coating such as Cytop (Asahi Glass Company), a silicone containing polymer coating (such as an aqueous-alcoholic PVM/MA based polymer solution with a dimethicone copolyol additive) or a polycarbonate coating. The surface coating minimizes or controls the adhesion of ink particles to the cell walls and substrate. Thus the appropriate coating strongly depends on the materials used in the display material or ink.

In FIG. 3, a display material 304 is deposited in the microcells 212. As used herein, "display material" is broadly defined to include any matter that changes light reflectance or transmittance characteristics in response to an applied electrical, or magnetic field, an electrical current, heat or an optical signal. The display material may be a liquid, a solid or a gas. An example of a liquid display material is a liquid ink solution that contains a plurality of charged colored particles in an optically transparent fluid. Alternate examples of a 'liquid' display material include electrophoretic suspension, emulsions, liquid crystal, and other similar materials. Alternately, the display material may be a powder which may include electrically charged toner particles. One example of a toner is an EA toner is described in U.S. Pat. No. 6,529,313 entitled "Electrophoretic displays, display fluids for use therein, and methods of displaying images" which describes the use of particles made from an emulsion aggregation process and the particles use in electrophoretic displays. When the ink is a powder, a gas or vacuum may fill over half of the microcell to allow easy particle movement through the microcell.

A number of methods of depositing display material 304 may be used, including printing, spraying, coating and doctorblading. In the illustrated embodiment, an ink is doctorbladed into the microcells.

In FIG. 4, a pressures sensitive tape 404 is pressed, laminated or otherwise applied to the top of the cell walls. "Pressure sensitive tape" as used herein is broadly defined as any sheet, typically a polymer sheet coated with a tacky adhesive layer such that under sufficient pressure, the adhesive bonds the sheet to a second material. There are several possible adhesion mechanisms that can contribute to the bond, such as mechanical adhesion, hydrogen-bonds between the substrate and the adhesive or van der Waals forces. A general description of bonding mechanisms is given for example in 'Introduction to physical polymer science', by L. H. Sperling, published by Wiley & Sons, Inc. and hereby incorporated by reference. In one embodiment, the sheet itself is the adhesive layer, for example, a polymer sheet may consist entirely of a tacky adhesive layer. The tacky adhesive layer may be made of a partially cross-linked polymer.

A pressure applying mechanism, such as roller 408, presses the top of pressure sensitive tape 404. The pressure causes the tape adhesive to adhere to the top of the cell walls. It is noted that even in the presence of water, isopar, and/or other liquids commonly present liquid based display materials, excellent adhesion can still be obtained. The adhesion may also occur at room temperature when heat may adversely affect the underlying structures. In structures that can withstand heat, elevated temperatures (typically between 60–90 degrees Centigrade) may be used to improve bond strength between the adhesive and the cell walls.

In one embodiment, pressure sensitive tape 404 is an ultraviolet (UV) sensitive pressure-sensitive adhesive tape typically used for wafer dicing. An example of such a tape is available from Furukawa Electric Co, Ltd of Tokyo, Japan, model UC-228W-10. The Furukawa double-sided tape includes a polyolefin carrier or backing film that is coated on both sides with an adhesive layer that includes a tacky, UV sensitive acrylic polymer. The polymer loses its adhesive properties when exposed to a sufficient quantity of UV radiation, typically with a dosage of at least 1 J/cm^2 at a wavelength between 320 and 390 nm. The tape thickness is typically over 100 microns in thickness, consisting of 70 microns for the backing layer and 2×20 microns for two acrylic adhesive layers. A protective PET (polyethylene terephthalate) film covers both sides of the adhesive. The protective PET film can be released before lamination. After UV exposure the adhesive strength decreases by at least an order of magnitude. One drawback of the Furukawa tape is the micro-cells are not well sealed. In particular, the bonds between the cell walls and the adhesive become substantially weaker during UV exposure resulting in a weak seal. In an alternate embodiment, pressure sensitive tape 404 is a dual stage pressure sensitive tape, such as that available from Adhesives Research, model X-84540 typically used as a moisture barrier film in OLED displays. In this dual stage tape, a pressure sensitive adhesive transfer film is sandwiched between two polyester release liners. A carrier or backing film is not present in this tape. Before use, a first release liner is removed leaving only a second release liner and the exposed adhesive layer. FIG. 4 shows the pressure sensitive tape after one release liner has been removed. In FIG. 4, adhesive layer 412 is bonded only to the second release liner 416. Roller 408 presses adhesive layer 412 against the top of the cell walls.

FIG. 5 shows pressure sensitive tape 404 exposed to UV radiation 504. A dosage or fluence of around 2 to 8 J/cm^2 at 320–390 nm UV light is typically used to achieve complete curing of the polymer tape. The UV radiation transforms or crosslinks the adhesive molecules such that the adhesive forms a layer that resists permeation by moisture and oxygen. As used herein, a polymer crosslinks by physically linking chains of a polymer molecule by means of a chemical process that inserts molecular links or bonds between points along the chains. The physical interference between the crosslinking molecules and the polymer chains allows less movement of the chains, making the overall substance more solid and dense Crosslinking also renders the polymer more chemically inert and less susceptible to reaction with solvents. The UV radiation also strengthens any bonds formed prior to UV exposure. Thus, the bond between the adhesive layer and the cell walls at points 508, 512 are strengthened. In regions of the adhesive layer over the microcell opening, the UV radiation changes the adhesive layer properties to substantially reduce tack. After tack reduction, the display material has a much lower probability of sticking to the crosslinked adhesive layer, diffusing into the layer, swelling the adhesive layer or otherwise reacting with the adhesive layer. The reduced interaction between the adhesive layer and the display material minimizes display degradation such as loss of display contrast.

Reducing the interaction between the adhesive layer and the display material minimizes display degradation caused by adhesive-display particulate interactions. Failure to minimize such interaction results in a significant contrast reduction when the adhesive layer bonds to display material. Substantial contrast reductions occur when in over 50% of the exposed adhesive area in a pixel display, particles are bonded to the adhesive area preventing color changes in those areas when a pixel changes color. By reducing the tackiness of the adhesive layer, such bonding of display particles will be kept to less than 50% of the area and thus the contrast ratio of the display will be degraded by less than 50%. Even more ideally, the bonding will be kept to less than 25% of the exposed adhesive in a pixel. However, as used herein, significant degradation of a display contrast ratio shall be understood to mean that the contrast is reduced by more than 50%, meaning that in at least 50% of the exposed area of an adhesive display particles will remain adhered, preventing a change of state.

The release liner 416 is removed in FIG. 6. Removing the release liner leaves only the cross linked adhesive layer 412 sealing the microcell. One benefit of the process is that the adhesive layer 412 is very uniform since the thickness is determined by the properties of the pressure sensitive tape, not by the sealing process. Another advantage is that the absence of the carrier layer allows the adhesive layer to be the sealing layer resulting in a very thin sealing layer, typically around 50 microns or less. Tapes of 15 and 25 micron thickness have been demonstrated. The adhesion layer is also flexible making it an ideal material for flexible displays or other non rigid structures. Finally, when cell walls are fabricated from a polymer that can form cross-links to the polymer in the adhesive layer during UV exposure, excellent sealing/bonding properties will result.

Figure 8:
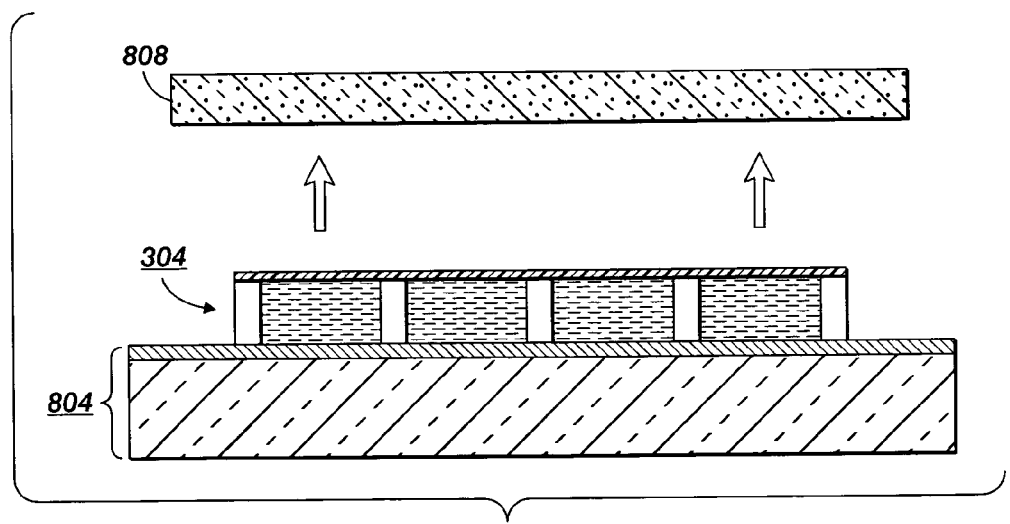

In one example, a polymer wall includes an epoxy with residual epoxy functionality. The UV-pressure sensitive adhesive includes a polymer with epoxy groups available to react. The UV light causes the epoxy groups of the two structural elements to cross-link with each other. Thus the UV radiation bonds the adhesive layer to the cell walls while simultaneously substantially reducing the tack from regions that do not contact the cell walls but will contact the display material or ink. Typical tack or adhesive forces prior to exposure to radiation often exceed $1.5 \times 10^{-4}$ Newtons per square mm. After exposure to radation, the tack or adhesive forces are reduced by more than an order of magnitude, thus the adhesive force is less than $1 \times 10^{-5}$ Newtons per square mm. When the structure is used in a display, further structures are bonded to the adhesive layer to enable the display. FIGS. 7 and 8 show the integrated structure used in display formation.

FIG. 7 shows one embodiment of fabricating a display where the original substrate 204 was a display top plate. One example of a typical substrate "top plate" material would be an indium tin oxide (ITO) coated Mylar. Such a top plate would be optically transparent yet still be conducting enough to allow current to flow across the ITO layer. An opposite side of the microcells (the opening side sealed with crosslinked adhesive) could be bonded to a backplane 704. Backplane 704 typically includes circuitry that couples to driver electronics that control the electric or magnetic field or other form of energy applied to each cell. By independently controlling the electric or magnetic field, the transmittance or reflectance of each cell region (e.g. several cells may be on top of a pixel) is controlled. For example, the electric field may move ink particles in each cell region to generate a desired image.

In an alternate embodiment, the cell structures are formed directly on a backplane. FIG. 8 shows the cell structure of FIG. 6 where substrate 204 is initially a display backplane 804. Backplane 804 typically includes control electronics that provide an electric field to display material 304 in each cell. To complete the display structure, a transparent top plate 808 may be bonded to the crosslinked adhesive layer 408. The transparent top plate may also include electronics to, in conjunction with the backplane, generate a controlled electric or magnetic field across display material 304. A typical transparent top plate may be an indium tin oxide (ITO) coated Mylar.

The preceding description may also be applied to fabricate other devices besides displays. For example, by substituting a luminescent powder (such as erbium doped gadolinium oxysulfite), a luminescent phosphor (such as GdOS:Er), a luminescent phosphor slurry for display material or a slurry of luminescent material for display material 304, an X-Ray conversion screen may be formed. Substituting a biological sample for display material 304 allows biological test samples to be sealed. Thus the invention should not be limited to display materials.

The preceding description describes a method of sealing microcells and includes various details which have been provided by way of example and to facilitate an understanding of the invention. Such details may include adhesive materials, display types, display materials as well as inks used and various other device specifics. Such details are not intended, and should not be used to limit the scope of the invention. For example, other adhesives may be used, and the techniques and structures described herein may be used to form other devices besides displays, such as sensors and the like. Thus, the invention should only be limited by the claims, as originally presented and as they may be amended to encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for sealing a microcell comprising the operations of:

forming a microcell cavity including a wall substantially surrounding an opening;

placing a display material inside the microcell cavity;

placing a pressure sensitive adhesive tape such that the tape adheres to the wall and covers the opening; and, exposing an adhesive polymer in the adhesive tape to radiation having a wavelength between 200 and 500 nm, the radiation to crosslink polymer molecules in the adhesive such that a first region of the adhesive tape in contact with the wall bonds to the wall, the crosslinking of polymer molecules in the adhesive causing a second region of the adhesive tape placed over the opening to have a substantially reduced tack such that the display material inside the microcell cavity may contact the crosslinked polymer tape without significant degradation of a contrast ratio of the display.

2. The method of claim 1 wherein the display material is a dry powder.

3. The method of claim 1 wherein the dry powder fills less than half the cavity, the remainder of the cavity filled with a gas.

4. The method of claim 1 wherein the display material is a liquid.

5. The method of claim 1 further comprising the operation of:
removing a release liner after the placing of the tacky adhesive tape such that only a adhesive layer having a thickness between 5 and 50 microns remains.

6. The method of claim 1 wherein the entire operation takes place at a temperature below 90 degrees centigrade.

7. A method of fabricating a display comprising the operations of:
forming a substrate;
forming a plurality of cells over the substrate;
depositing a display material in each cell in the plurality of cells;
placing a pressure sensitive adhesive tape over the plurality of cells, the pressure sensitive adhesive tape forming a sealing layer that seals each cell in the plurality of cells; and,
exposing an adhesive in the pressure sensitive adhesive tape to light having a wavelength between 200 and 500 nm, the light to crosslink polymer molecules in the adhesive of the adhesive tape in order to prevent adhesion of the adhesive to particles in the display material in each cell.

8. The method of claim 7 further comprising the operation of:
removing a liner supporting the adhesive after exposure to the light.

9. The method of claim 7 wherein the substrate is a backplane for the display, the backplane including circuitry to apply an electric field to the cells in the plurality of cells.

10. The method of claim 9 further comprising the operation of bonding a transparent top plate to the adhesive layer of the pressure sensitive tape, wherein the adhesive layer forms a cross-linked sealing layer.

11. The method of claim 10 wherein the transparent top plate is coated with conductive indium tin oxide (ITO).

12. The method of claim 7 wherein the substrate is a transparent top plate for the display.

13. The method of claim 12 further comprising the operation of bonding a display backplane to the adhesive layer of the pressure sensitive tape wherein the adhesive layer forms a cross-linked sealing layer.

14. The method of claim 13 wherein the backplane includes electronics to apply an electric field to the display material in the cells, the display material including particles that changes the appearance of light propagating through the top plate.

15. The method of claim 14 wherein the backplane is an active matrix backplane.

16. The method of claim 7 wherein the display material is one of an electrophoretic ink or magnetophoretic ink.

17. The method of claim 7 wherein the display material is a dry-toner.

18. The method of claim 9 further comprising:
coupling the backplane to driver circuitry, the driver circuitry to receive electronic signals representing a pixelated image, the driver circuitry to apply an electric signal to each cell in the plurality of cells to generate an image approximately matching the pixelated image.

19. The method of claim 7 wherein the adhesive in the pressure sensitive tape has a stickiness that exerts a force on an object exceeding $1.0 \times 10^{-4}$ Newtons per square millimeter prior to exposure to the light, the stickiness reduced to exert a force on an object less than $1.0 \times 10^{-5}$ Newtons per square millimeter after exposure to the light.

20. The method of claim 14 further comprising:
coupling the backplane to driver circuitry, the driver circuitry to receive electronic signals representing a pixelated image, the driver circuitry to apply an electric signal to each cell in the plurality of cells to generate an image approximately matching the pixelated image.

21. An array of sealed cell comprising:
a substrate;
a plurality of cells formed over the substrate;
a material deposited in each cell in the plurality of cells;
a pressure sensitive tape over the plurality of cells, the pressure sensitive tape sealing each cell in the plurality of cells, an adhesive in the pressure sensitive tape crosslinked by radiation having a wavelength between 200 and 500 nm, the radiation to prevent permanent adhesion of the adhesive to the material deposited in each cell.

22. The sealed array of cells of claim 21 wherein the material deposited in each cell in the plurality of cells is a display material.

23. The sealed array of cells of claim 21 wherein the material deposited in each cell in the plurality of cells is a luminescent phosphor material.

* * * * *